(12) United States Patent
Poppe

(10) Patent No.: US 7,908,367 B2
(45) Date of Patent: Mar. 15, 2011

(54) CALL PROCESSING SYSTEM AND METHOD

(75) Inventor: Tobias Poppe, Woking (GB)

(73) Assignee: Cellcrypt Limited, London (GB)

( * ) Notice: Subject to any disclaimer, the term of this patent is extended or adjusted under 35 U.S.C. 154(b) by 152 days.

(21) Appl. No.: 12/174,021

(22) Filed: Jul. 16, 2008

(65) Prior Publication Data
US 2009/0077230 A1    Mar. 19, 2009

(30) Foreign Application Priority Data
Jul. 16, 2007 (GB) .................................. 0713786.2

(51) Int. Cl.
*G06F 15/173* (2006.01)
(52) U.S. Cl. ....................................... 709/224
(58) Field of Classification Search .................. 709/224; 379/32.01, 1.01
See application file for complete search history.

(56) References Cited

U.S. PATENT DOCUMENTS

| | | | |
|---|---|---|---|
| 5,544,152 A * | 8/1996 | Obermanns et al. | 370/409 |
| 6,249,674 B1 * | 6/2001 | Verdonk | 455/404.1 |
| 6,788,783 B1 * | 9/2004 | Deichstetter | 379/338 |
| 7,218,711 B2 * | 5/2007 | Pines et al. | 379/114.01 |

* cited by examiner

*Primary Examiner* — David Y Eng
(74) *Attorney, Agent, or Firm* — Leason Ellis LLP

(57) ABSTRACT

A call processing system (10) and method are disclosed. The connection status between a node (40) and a data communications network (20) is monitored. The node (40) is arranged to receive calls over the data communications network. Monitoring is by the call processing system (10). Rather than only performing a call connection when the called node is identified as being available as in conventional systems, if the call processing system (10) determines that the node (40) has been disconnected from the data communications network for a first predetermined period of time, the call processing system (10) is arranged to wait a second predetermined period of time before indicating non-availability of the node. In this way, unavailability determinations are reduced and call connection requests are processed even in situations in which the node (40) has been disconnected during the first period of time.

19 Claims, 1 Drawing Sheet

CALL PROCESSING SYSTEM AND METHOD

This application claims the benefit of priority under 35 U.S.C. Section 119(a) from G.B. 0713786.2, entitled "Call Processing System and Method," filed Jul. 16, 2007, the entirety of which is hereby incorporated by reference.

FIELD OF THE INVENTION

The present invention relates to a call processing system and method that is particularly suitable for use in data communication networks where clients may have unreliable connectivity.

BACKGROUND TO THE INVENTION

In data communications networks, an intermediate switching node or system is typically responsible for managing the connection between a calling node and a receiving node. This management typically includes receiving an initial call set up request from the calling node and establishing a connection to the receiving node.

Particularly in data communication networks that operate on a mobile network or indeed other data communication networks where connectivity between a node and the network is not guaranteed, call set up and call maintenance can be difficult as a node that is connected to a network at one moment may not be connected the next.

This problem has become particularly noticeable in voice over IP (VOIP) communications which typically use the Internet and other data communication backgrounds. This problem is further exacerbated by technology such as ADSL which are known to have difficulties maintaining connections when a large number of users are contending for the same bandwidth. The very nature of IP based networks means connections can be lost and re-established. Other issues such as assignment of a new IP address, NAT gateway timeout, firewall reset, changing in routing, and reset of an intermediate switch/router all can cause loss and subsequent re-establishment of a connection.

Particularly in the case of a node connected to Internet protocol (IP) based networks, it is quite common for the node to lose and immediately re-establish a connection. Not only can this happen during occasions when a node loses communication with its controlling network/switch or the like, it also happens that scheduled times when the nodes IP addressed is refreshed by its DHCP server.

In most cases, the underlying network infrastructure and applications in use are programmed or configured to accommodate these situations. However, it is much more difficult to accommodate such situations in real-time protocols and applications as the recipient is typically expecting an immediate answer/acknowledgement.

SUMMARY OF THE INVENTION

According to an aspect of the present invention there is provided a call processing system having a machine executing code that is arranged to monitor the connection status between a node and a data communications network, the node being arranged to receive calls over the data communications network, wherein the code is further arranged to respond to the receipt of a call connection request for the node within a first predetermined period of time of the node having disconnected from the data communications network by waiting a second predetermined period of time before indicating non-availability of the node.

As such, the processing system and method of the present invention are configured to manage call connection requests in terms of first and second predetermined periods of time, in which a call connection request that is received during the first predetermined period of time after disconnection of the called party node from the data communication network is not rejected as an unavailable node, but rather the system and method wait a second period of time which allows for reconnection of the called party node before indicating non-availability of the called party node.

The system is preferably arranged to receive the call connection request from a calling party for a connection to the node, the system being arranged to trigger establishment of a connection between the calling party and the node if the node is connected to the data communications network.

If the node is not connected to the data communications network and has not disconnected from the data communications network within the first predetermined period of time, the system is arranged to decline the connection request.

Preferably, the call processing system is arranged to trigger establishment of the connection if the node is detected connecting to the data communications network during the second predetermined period.

Preferably, the call processing system is connected to the data communications network and is remote of the node.

The call processing system may be arranged to record connection status data on the node in a database and is arranged to determine connection status of the node in dependence on the database contents.

The call processing system may be arranged to record historic connection status data on the node in the database.

The call processing system may be arranged to determine the duration of the second predetermined period in dependence on the historic connection status data in the database.

The call processing system may be arranged to determine the duration of the first predetermined period in dependence on the historic connection status data in the database.

The call processing system may be arranged to determine the duration of the second predetermined period in dependence on statistical and/or heuristic analysis of the historic connection status data in the database.

The call processing system may be arranged to determine the duration of the second predetermined period in dependence on statistical and/or heuristic analysis of the historic connection status data in the database.

The system may further comprise a monitoring agent and a processing agent, wherein the monitoring agent is remote of the processing agent, the monitoring agent being arranged to perform said monitoring of said connection status of said node and report status data to the processing agent, the processing agent being arranged to process call connection requests for the node in dependence on the status data.

The data communications network preferably comprises an Internet Protocol network.

According to another aspect of the present invention, there is provided a method of processing calls comprising:

monitoring the connection status between a node and a data communications network, the node being arranged to receive calls over the data communications network; and, if a call connection request is received for the node within a first predetermined period of time of the node having disconnected from the data communications network, waiting a second predetermined period of time before indicating non-availability of the node.

The method may further comprise recording connection status data on the node in a database; and, determining connection status of the node in dependence on contents of the database.

The method may further comprise recording historic connection status data on the node in the database.

The method may further comprise determining the duration of the second predetermined period in dependence on the historic connection status data in the database.

The method may further comprise determining the duration of the first predetermined period in dependence on the historic connection status data in the database.

According to another aspect of the present invention, there is provided a computer readable carrier encoding a computer program, the computer program comprising:

computer program code for monitoring the connection status between a node and a data communications network, the node being arranged to receive calls over the data communications network;

computer program code for determining if a call connection request is received for the node within a first predetermined period of time of the node having disconnected from the data communications network; and, computer program code for, upon reaching said determination, waiting a second predetermined period of time before indicating non-availability of the node.

Embodiments of the present invention seek to provide a system and method in which non-reliable network connections can be accommodated during call set up. If a call set up request arrives at a conventional call set up system, call set up is only performed if the called node can be identified as being available. In embodiments of the present invention, connectivity of the called node is monitored such that if they were disconnected immediately prior to receipt of the call set up request or within a predetermined time frame then the call processing system is arranged to provide a predetermined period of time for the called node to re-connect before continuing with the call setup.

Obviously this will not help where connection has been deliberately dropped (such as when a terminal is shut down after use) but will assist where disconnection is unintentional and the called node immediately re-connects as is the case in many network related faults.

BRIEF DESCRIPTION OF THE DRAWINGS

An embodiment of the present invention will now be described in detail, by way of example only, with reference to the accompanying drawings in which.

DETAILED DESCRIPTION

Figure 1:
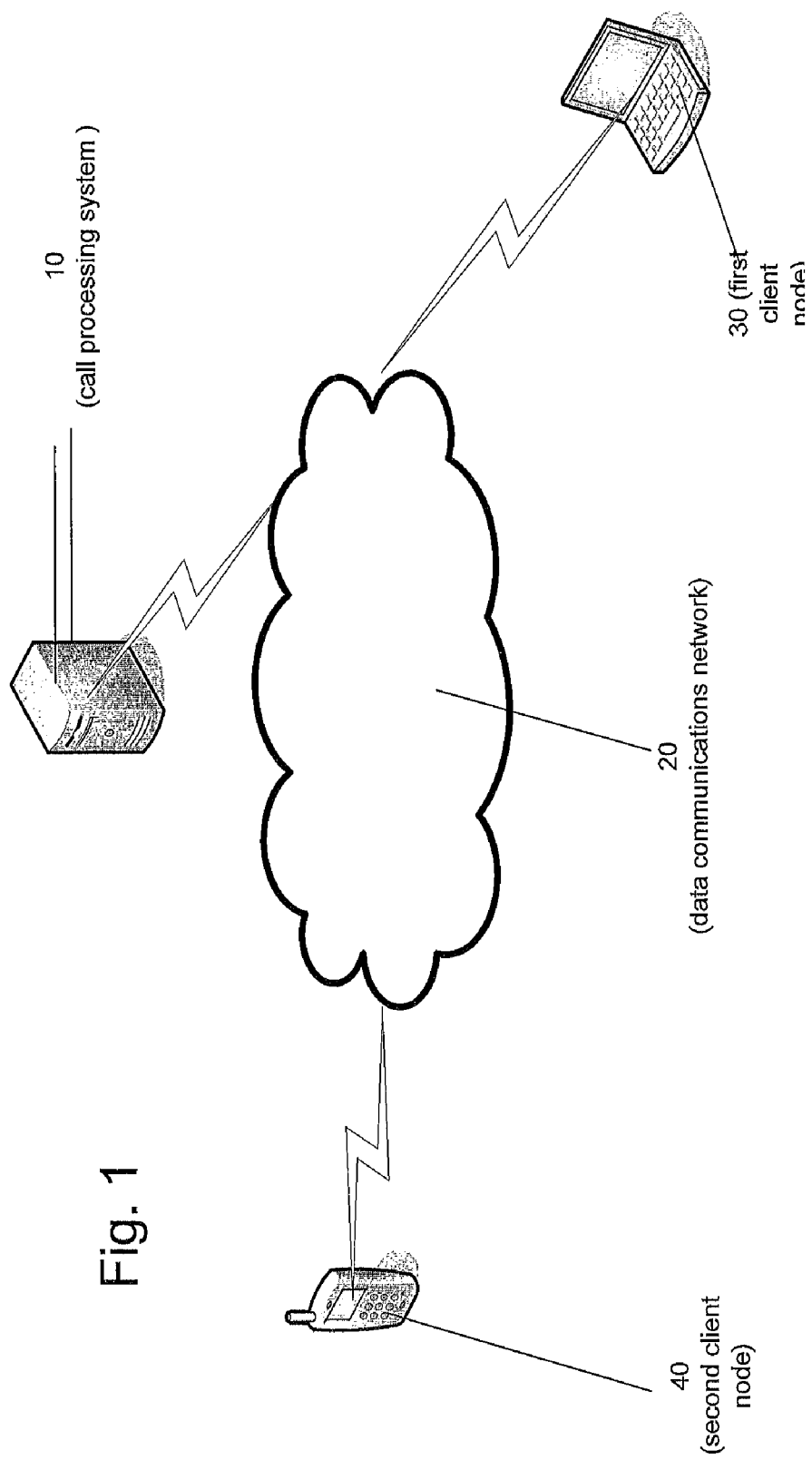
FIG. 1 is a schematic diagram of a call processing system according to an embodiment of the present invention.

FIG. 1 is a schematic diagram of a call processing system according to an embodiment of the present invention.

A call processing system 10 is connected to a data communication network 20. Client nodes 30, 40 are also connected to the data communications network 20. The call processing system 10 includes software code executing therein or at machine associated therewith which is arranged to monitor connectivity status of the client nodes 30, 40 to the data communications network 20.

When a client node wishes to establish a communication session with another client node, a client application executing at the client node issues a call set up request to the call processing system 10. For example, if the first client node 30 wishes to communicate with the second client node 40, it issues a call set up request to the call processing system 10 over the data communications network 20 identifying itself and the second client node 40 as intended participants of the call.

Upon receipt of a call set up request, the software associated with the call processing system 10 cross references the intended call receiving party (in this case the second client node 40) to identify whether or not it is currently connected to the data communications network 20. Assuming the node is currently connected then the call processing system 10 proceeds to set up the call.

If the receiving node is not currently connected to the data communications network 20 then the software associated with the call processing system 10 checks to see whether or not the node has been connected within a (first) predetermined time frame. This test can comprise searching a database for connectivity information concerning a previous communication from or to the receiving node. For example, the (first) time frame may be anything from 1 second to 2 minutes or more. If the receiving node 40 has been connected within the (first) time frame, then the call processing system 10 waits for a (second) predetermined period of time. After the (second) predetermined period of time has expired, a routine executing under control of the call processing system 10 again checks the connection status of the intended receiving node. If the receiving node re-connects to the data communications network 20 within the predetermined period of time then the call processing system 10 proceeds to set up the call. If the intended receiving node 40 did not connect then the call processing system reports to the calling node 30 that the intended receiving node 40 is unavailable. Optionally, the call processing system may route the calling node to a voicemail system or the like.

If a calling node requests connection to a desired receiving node that has not been connected to the data communications network 20 within the predetermined time frame, then the call processing system 10 reports that the node is unavailable in a conventional manner.

For example, the call processing system may wait for, for example, 5 seconds, before checking to see whether a reconnection has happened.

In addition to basic connection status monitoring, the call processing system may perform other types of statistical or heuristic analysis of connection status of the various nodes. For example, the call processing system 10 may identify patterns in terms of connection status based on past history and use these to determine whether or not reconnection can be expected.

It will be appreciated that it need not be a single node that performs both call set up and connection monitoring. Indeed, connection monitoring could be a distributed task performed by switching nodes or the like that sit at the boundaries to networks and obtain the connections on behalf of the respective nodes. As such, the call processing system 10 may comprise a monitoring agent and a processing agent. The monitoring agent is remote of the processing agent. The monitoring agent is arranged to perform monitoring of the connection status of the node and report status data to the processing agent. The processing agent is arranged to process call connection requests for the node in dependence on the status data.

The invention claimed is:

1. A call processing system, comprising:
    a machine having connectivity to a node and to a data communication network; and
    code executing in the machine that is arranged to configure the machine so as to monitor a connection status between the node and the data communications network, the node being arranged to receive calls over the data communications network, wherein the code is further arranged to respond to the receipt of a call connection request for the node within a first predetermined period of time of the node having disconnected from the data communications network by waiting a second predetermined period of time before indicating non-availability of the node.

2. A call processing system according to claim 1, wherein the call connection request is received from a calling party for a connection to the node, and wherein the code is further arranged to trigger the establishment of a connection between the calling party and the node if the node is connected to the data communications network.

3. A call processing system according to claim 2, wherein the code is further configured to decline the connection request if the node is not connected to the data communications network and has not disconnected from the data communications network within the first predetermined period of time.

4. A call processing system according to claim 2, wherein the code is further arranged to trigger the establishment of the connection if the node is detected connecting to the data communications network during the second predetermined period.

5. A call processing system according to claim 1, wherein the call processing system is connected to the data communications network and is remote of the node.

6. A call processing system according to claim 1, wherein the code is further arranged to record connection status data on the node in a database and to determine connection status of the node in dependence on the database contents.

7. A call processing system according to claim 6, wherein the code is further arranged to record historic connection status data on the node in the database.

8. A call processing system according to claim 7, wherein the code is further arranged to determine the duration of the second predetermined period in dependence on the historic connection status data in the database.

9. A call processing system according to claim 7, wherein the code is further arranged to determine the duration of the first predetermined period in dependence on the historic connection status data in the database.

10. A call processing system according to claim 8, wherein the code is further arranged to determine the duration of the second predetermined period in dependence on statistical and/or heuristic analysis of the historic connection status data in the database.

11. A call processing system according to claim 9, wherein the code is further arranged to determine the duration of the second predetermined period in dependence on statistical and/or heuristic analysis of the historic connection status data in the database.

12. A call processing system according to claim 1, further comprising a monitoring agent and a processing agent, wherein the monitoring agent is distinct from the processing agent, the monitoring agent being arranged to perform said monitoring of said connection status of said node and report status data to the processing agent, the processing agent being arranged to process call connection requests for the node in dependence on the status data.

13. A call processing system according to claim 1, wherein the data communications network comprises an Internet Protocol network.

14. A method of processing calls comprising the steps of:
monitoring the connection status between a node and a data communications network, the node being arranged to receive calls over the data communications network; and
if a call connection request is received for the node within a first predetermined period of time of the node having disconnected from the data communications network, waiting a second predetermined period of time before indicating non-availability of the node.

15. A method according to claim 14, further comprising:
recording connection status data on the node in a database; and,
determining connection status of the node in dependence on contents of the database.

16. A method according to claim 15, further comprising recording historic connection status data on the node in the database.

17. A method according to claim 16, further comprising determining the duration of the second predetermined period in dependence on the historic connection status data in the database.

18. A method according to claim 16, further comprising determining the duration of the first predetermined period in dependence on the historic connection status data in the database.

19. A computer-readable storage medium for storing machine-executable instructions, that, when executed by a processor cause the processor to implement a method comprising the steps of:
monitoring the connection status between a node and a data communications network, the node being arranged to receive calls over the data communications network;
determining if a call connection request is received for the node within a first predetermined period of time of the node having disconnected from the data communications network; and
upon reaching said determination, waiting a second predetermined period of time before indicating non-availability of the node.

* * * * *